(12) United States Patent
Kabir

(10) Patent No.: US 10,897,560 B2
(45) Date of Patent: Jan. 19, 2021

(54) IMAGING DEVICES AND METHODS FOR REDUCING IMAGE ARTIFACTS

(71) Applicant: Rambus Inc., Sunnyvale, CA (US)

(72) Inventor: Salman Kabir, Santa Clara, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 15/979,296

(22) Filed: May 14, 2018

(65) Prior Publication Data

US 2018/0359397 A1 Dec. 13, 2018

Related U.S. Application Data

(60) Provisional application No. 62/516,415, filed on Jun. 7, 2017.

(51) Int. Cl.
*H04N 5/225* (2006.01)
*H04N 9/73* (2006.01)
*H04N 5/238* (2006.01)
*H04N 5/232* (2006.01)

(52) U.S. Cl.
CPC ......... *H04N 5/2254* (2013.01); *H04N 5/238* (2013.01); *H04N 5/23229* (2013.01); *H04N 9/735* (2013.01)

(58) Field of Classification Search
CPC ......... G06T 5/002; G06T 5/005; G06T 5/006; G06T 2207/20182; G06K 9/40; H04N 5/357–3675; H04N 9/646; G01N 21/45
USPC ............. 382/275, 274, 382; 348/207.2, 335; 359/574, 569, 559, 563, 564; 250/216; 356/328
See application file for complete search history.

(56) References Cited

U.S. PATENT DOCUMENTS

| | | | |
|---|---|---|---|
| 2008/0131018 | A1 | 6/2008 | Findlay et al. |
| 2009/0316141 | A1* | 12/2009 | Feldkhun ........... G01N 21/6458 356/217 |
| 2010/0310165 | A1* | 12/2010 | Chen ..................... G06T 5/003 382/167 |
| 2011/0292257 | A1* | 12/2011 | Hatakeyama .......... H04N 5/208 348/242 |
| 2014/0177790 | A1* | 6/2014 | Bone ................. G01N 23/20075 378/36 |

(Continued)

OTHER PUBLICATIONS

Changyin Zhou, "Point Spread Function Engineering for Scene Recovery", Columbia University 2012 Submitted in partial fulfillment of the requirements for the degree of Doctor of Philosophy in the Graduate School of Arts and Sciences, Downloaded at: http://www.cs.columbia.edu/~changyin/files/Changyin_Zhou_Phd_Thesis.pdf, 2012. 153 pages.

*Primary Examiner* — Xi Wang

(74) *Attorney, Agent, or Firm* — Silicon Edge Law Group LLP; Arthur J. Behiel

(57) ABSTRACT

An imaging system with a diffractive optic captures an interference pattern responsive to light from an imaged scene to represent the scene in a spatial-frequency domain. The sampled frequency-domain image data has properties that are determined by the point-spread function of the diffractive optic and characteristics of the scene. An integrated processor can analyze the characteristics of captured image data and select one of multiple available reconstruction kernels for transforming the frequency-domain image data into a spatial-domain image of the scene.

12 Claims, 4 Drawing Sheets

(56) References Cited

U.S. PATENT DOCUMENTS

| | | | |
|---|---|---|---|
| 2014/0253781 A1* | 9/2014 | Gill | G02B 5/1842 |
| | | | 348/335 |
| 2015/0078661 A1* | 3/2015 | Granados | G06T 5/009 |
| | | | 382/167 |
| 2015/0254814 A1 | 9/2015 | All et al. | |
| 2015/0293018 A1* | 10/2015 | Stork | G01J 1/0437 |
| | | | 250/550 |
| 2015/0294186 A1 | 10/2015 | All et al. | |
| 2016/0109387 A1 | 4/2016 | Pan et al. | |

* cited by examiner

IMAGING DEVICES AND METHODS FOR REDUCING IMAGE ARTIFACTS

BACKGROUND

Optics can be thought of as performing mathematical operations transforming light intensities from different incident angles to locations on a two-dimensional image sensor. In the case of focusing optics, this transformation is the identity function: each angle is mapped to a distinct corresponding point on an image sensor. When focusing optics are impractical due to size, cost, or material constraints, the right diffractive optic can perform an operation other than the identity function that is nonetheless useful to produce a final image. In such cases the sensed data may bear little or no resemblance to the captured scene; however, a desired digital image can be computed from the sensor outputs.

BRIEF DESCRIPTION OF THE DRAWINGS

The present disclosure is illustrated by way of example, and not by way of limitation, in the figures of the accompanying drawings and in which like references refer to similar elements and in which.

DETAILED DESCRIPTION

Figure 1:
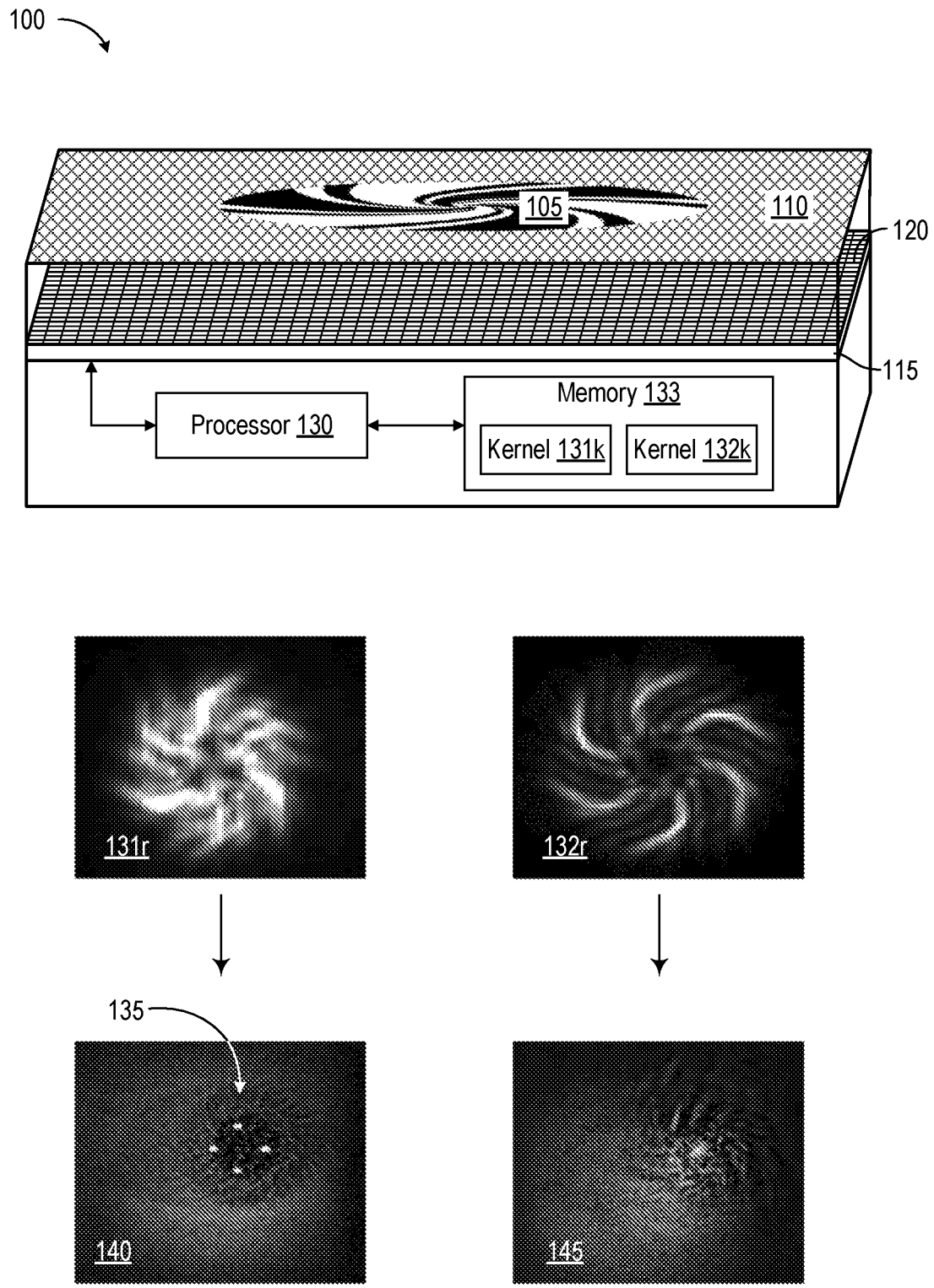
FIG. 1 depicts an imaging device 100 with diffractive optic 105 centered in an opaque aperture layer 110 over a two-dimensional array 115 of photosensitive elements 120, or "pixels."

FIG. 1 depicts an imaging device 100 with diffractive optic 105 centered in an opaque aperture layer 110 over a two-dimensional array 115 of photosensitive elements 120, or "pixels." Optic 105, a diffraction grating, induces near-field spatial modulations in light from the scene to generate an interference pattern. Array 115 samples this interference pattern to acquire image data representative of the scene in a spatial-frequency domain. An integrated processor 130 inverts the function imposed by the spatial modulations using one or more reconstruction kernels 131$k$ and 132$k$ stored in an associated memory 133. Kernels 131$k$ and 132$k$ are convolution matrices that when convolved with the sampled frequency-domain image data produce a spatial-domain image of the scene. Processor 130 and associated memory 133 can also be provided remotely, or can be distributed between local and remote compute resources.

In this example diffractive optic 105 is a phase grating with a pattern of binary features that create diverging lines of odd symmetry. These features, examples of which are detailed in U.S. Pat. No. 9,110,240 to Patrick R. Gill and David G. Stork, offer considerable insensitivity to the wavelength of incident light over a wavelength band of interest, and also to the manufactured distance between optic 105 and the underlying array of photosensitive elements 120. The patterns also offer sensitivity over a gamut of spatial frequencies. In this disclosure, references to "frequency" relate to "spatial frequency," the level of detail present in image data per degree of visual angle. At the extremes of operating parameters, such as for very bright point sources, image artifacts can be challenging to resolve, however, due to mismatch of wavelength between the kernel and the bright point in the image scene.

Diffractive optic 105 exhibits spiral point-spread functions that differ for different spectra of incident light. This example shows a first response 131$r$ to an infrared point source and a second response 132$r$ to an incandescent point source. Reconstruction kernels 131$k$ and 132$k$ are mathematical representations of corresponding responses 131$r$ and 132$r$. Using first deconstruction kernel 131$k$ corresponding to first response 131$r$ to compute an image of four infrared reflections 135 off the surface of a human eye produces an image 140 that can be used e.g. for eye tracking. Using second deconstruction kernel 132$k$ corresponding to second response 132$r$ to image the same scene produces an image 145 with insufficient fidelity to locate the infrared reflections. Imaging device 100 can analyze captured image data to determine what point-spread response or combination of responses is best suited to compute an image from a sampled interference pattern, and may support specialized processing elements that aid fast, power-efficient Fourier-domain or spatial-domain deconvolution.

Figure 2:
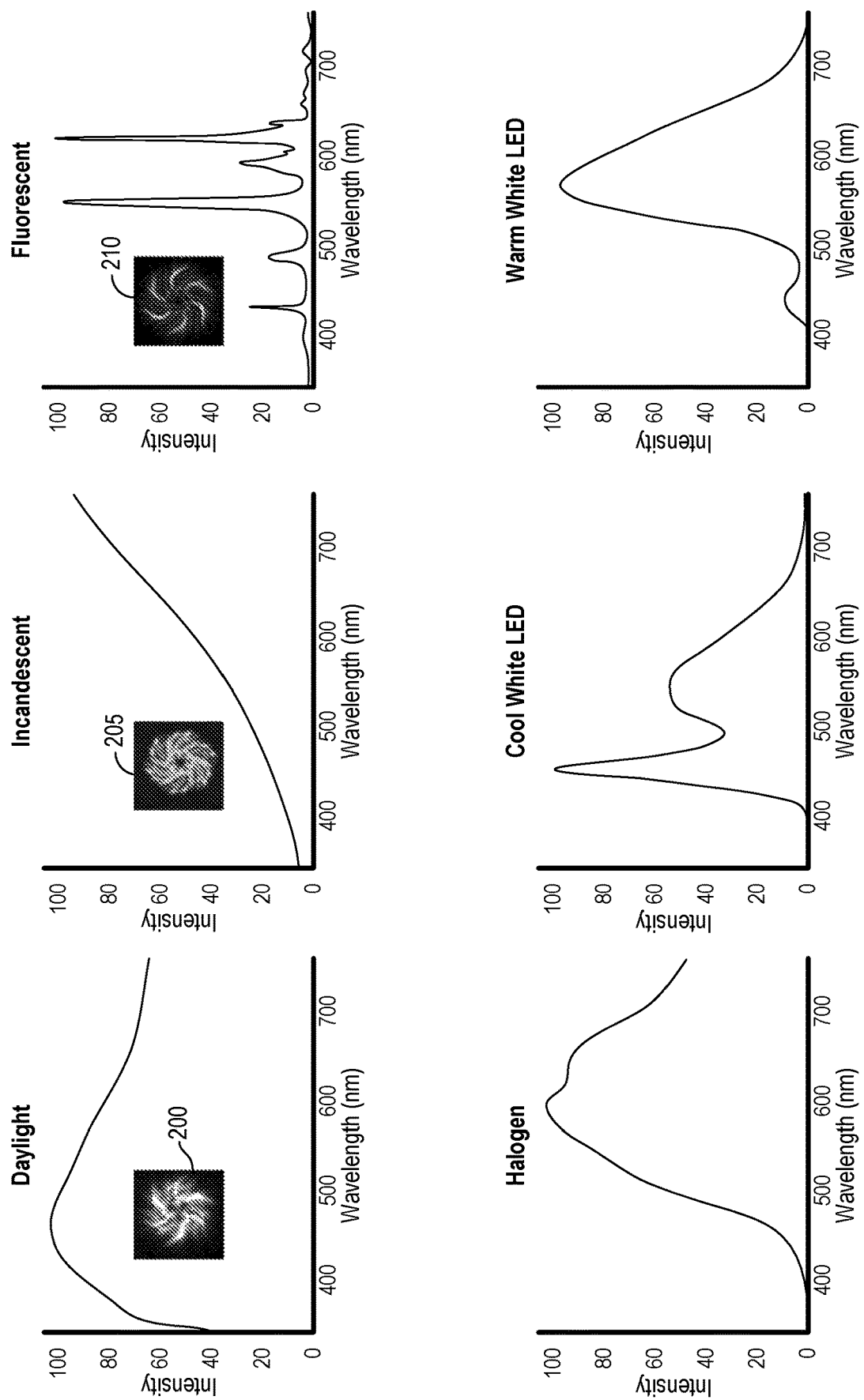
FIG. 2 depicts six spectra for common types of light sources.

FIG. 2 depicts six spectra for common types of light sources. Reconstruction kernels, illustrated here as point-source responses 200, 205, and 210 for daylight, incandescent light, and fluorescent light, are created for the point-spread functions of imaging device 100 using a calibration procedure or a high-fidelity simulation. Point-source responses 200, 205, and 210 are different from one another and from the responses corresponding to other light sources and combinations of light sources.

Each reconstruction kernel is best suited for a select spectrum. Bright sources heighten the distortion created from a kernel that does not match the light from the imaged scene. Inverting sampled image data using a reconstruction kernel that is not matched to the point-source response for light from the sampled scene can thus produce a distorted image reconstruction. No one kernel is optimal for all imaged scenes.

Multiple reconstruction kernels are stored in memory 133 to allow imaging device 100 to select a kernel tailored to the different light sources imaging device 100 is likely to sample. Additional reconstruction kernels can be provided for other anticipated image characteristics, such as other spectra, combinations of spectra, spatial-frequency content, and dynamic range. Imaging device 100 may also match the shape of artifact 425 against the available reconstruction kernels to identify or verify the best-fit reconstruction kernel, and may allow the user to manually select a reconstruction kernel from a library of kernels.

Figure 3:
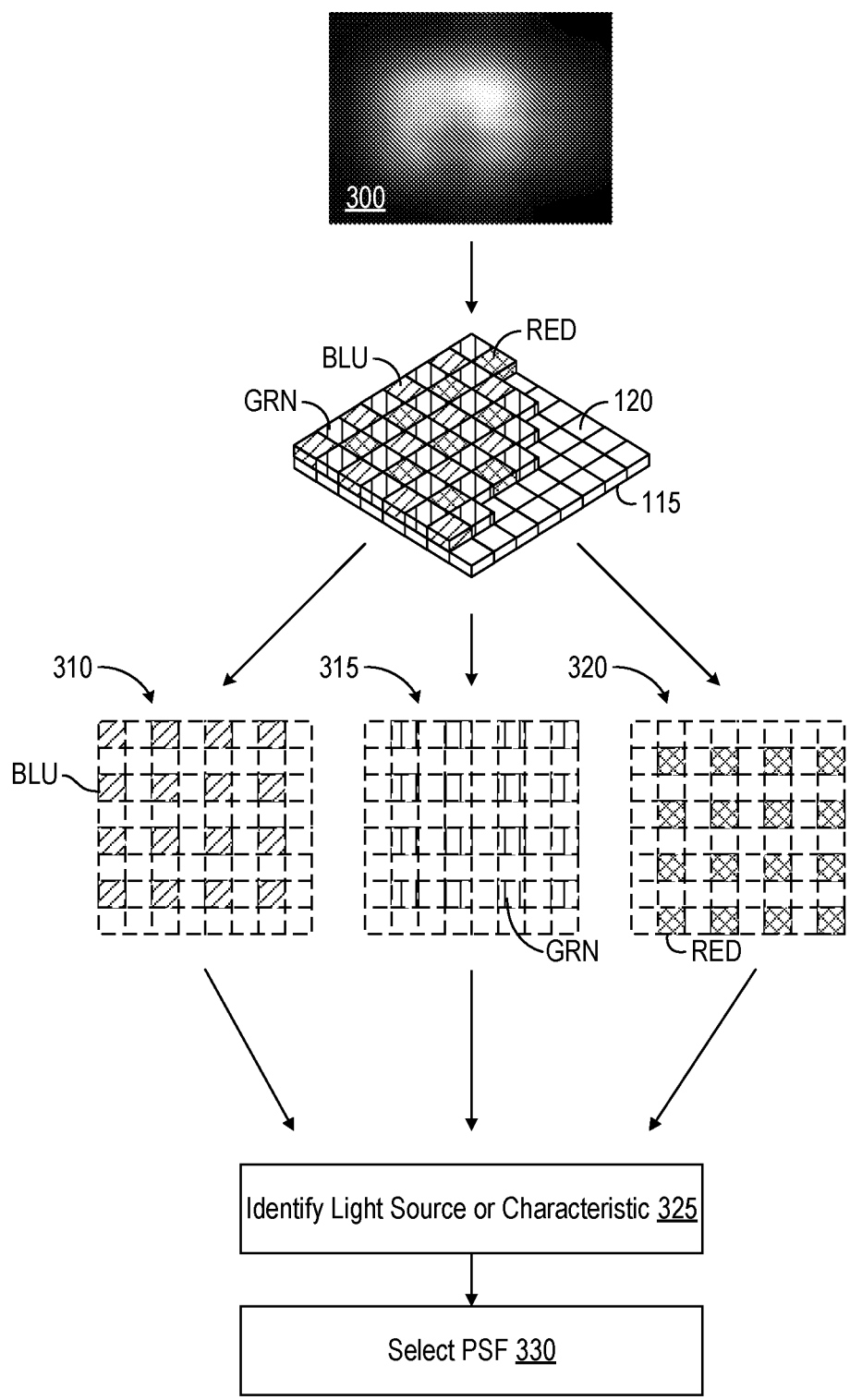
FIG. 3 illustrates how a reconstruction kernel is selected responsive to an interference pattern 300.

FIG. 3 illustrates how a reconstruction kernel is selected responsive to an interference pattern 300. As detailed in connection with FIG. 1, photosensitive element 120 of an array 115 samples interference pattern 300. Before sampling, the light passes through a Bayer color filter mosaic in which each two-by-two sub-mosaic contains two green GRN, one blue BLU, and one red RED filter, each covering one photosensitive element 120. The sampled data can be represented as three color channels 310, 315, and 320. In one implementation, processor 130 locates one or more relatively bright areas in a sampled image and uses the color content in these areas, represented by the relative intensities of the three color channels, to identify the type of light source or to identify characteristics of the light source sampled at the bright spot (325). Based on the identified type of light source, processor 130 than selects an appropriate kernel from local or remote memory to construct an image of the sampled scene (330). With reference to FIG. 2, for example, processor 130 might construct an image from interference pattern 300 using kernel 210 if the color channels for the bright regions of pattern 300 exhibit properties of fluorescent light.

In other implementations, the processor 130 may use various other techniques to select an appropriate kernel. For example, the processor 130 may include or have access to a separate sensor, such as an RGBIR sensor or spectrometer, to identify or verify the light source. In some embodiments a small subset of photosensitive elements 120 can be provided with filters or be otherwise sensitized to one or more colors or color bands to provide measures of relative intensities between different wavelengths. In a black-and-white image detector in accordance with one embodiment, for example, some of peripheral elements 120 are covered with a filter layer that passes infrared and largely excludes the visible spectrum, while the remaining elements 120 lack the filter layer and are thus relatively sensitive to visible light. The image detector can select a reconstruction kernel by comparing the measured intensities from the infrared element(s) 120 with the measured intensity from the remaining pixels.

Figure 4:
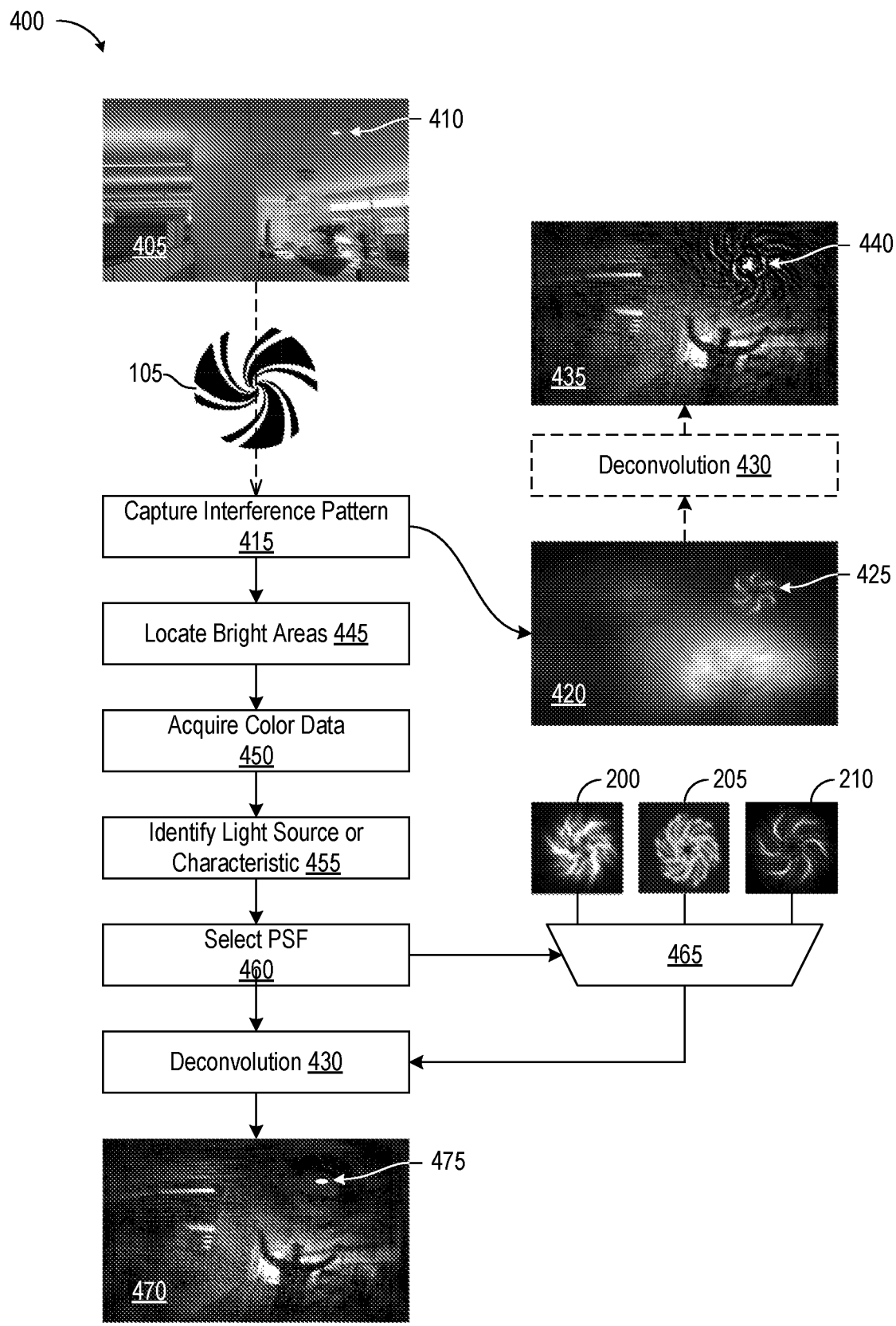
FIG. 4 is a flowchart 400 detailing how imaging device 100 of FIG. 1 captures and resolves an image in accordance with an embodiment

FIG. 4 is a flowchart 400 detailing how imaging device 100 of FIG. 1 captures and resolves an image in accordance with an embodiment. First, device 100 is oriented such that light from a scene 405 of interest is incident diffractive optic 105. This exemplary scene 405 includes a fluorescent light fixture 410 as an example of a relatively bright point source. The incident light passes through diffractive optic 105, which modulates the received light to produce intensity patterns for capture by underlying photodetector array 115 as a raw data set that represents scene 405 in the spatial-frequency domain (415). An image 420 representing the intensity values of the sampled frequency-domain image data of step 415 is unintelligible to a human observer but is a predictable transformation of the incident scene.

The sampled frequency-domain image data has one or more image properties determined by the point-spread function of diffractive optic 105 and characteristics of scene 405. In the instant example, the sampled frequency-domain image data represented by image 420 includes a halo artifact 425 of a shape determined by the point-spread function of diffractive optic 105 and areas of saturation or relatively high intensity that can be associated with or outside of halo artifact 425.

The sampled frequency-domain image data can be deconvolved using e.g. Fourier deconvolution 430 to construct an image 435 of scene 405 in the pixel domain using a reconstruction kernel for optic 105 and e.g. incandescent light, possibly in combination with the underlying array. (The reader may notice a person with raised arms in image 435 that was not part of scene 405. The sampled scene was of the same room but with the person posed beneath light fixture 410.) Using the incandescent reconstruction kernel 205 to deconvolve a bright, fluorescent point source like fixture 410 can produce an undesirable halo artifact 440.

Imaging device 100 supports image processing that reduces or eliminates halo artifacts by selecting a reconstruction kernel based on characteristics of captured data. Processor 130 identifies relatively bright areas (445) of the frequency-domain image 420, which allows processor 130 to disregard relatively dim samples that may not represent a full spectrum of the light responsible for artifact 440 and are unlikely to cause significant artifacts. In one embodiment, processor 130 identifies each roughly circular suprathreshold scene object as an area of interest. The center of each of these areas is located and presumed to represent the location of a point source. In the instant example, process 445 notes the location of the point source associated with artifact 425.

Next, in step 450, processor 130 separates the color channels in bright areas of artifact 425. These data are then used in step 455 to identify the type of light source or to identify characteristics of the light source, the fluorescent light from fixture 410 in this example. This identification can be made by comparing the relative intensities of the color channels to a database of spectral information stored in e.g. memory 133. Imaging device 100 can disregard saturated pixels in the bright areas and use automatic exposure control to minimize the number of saturated pixels. If the frequency-domain image lacks a bright source the light source can be identified by analyzing grey areas. In one embodiment imaging system 100 can take a low-resolution image with exposure optimized for the bright spots for light-source identification and then follow up with a second image optimized for the overall scene.

However the light source is identified, processor 130 uses the identity of the light source to select a corresponding reconstruction kernel (460) from among a plurality of available reconstruction kernels. This selection is illustrated here using a multiplexer 465 that passes one of the three reconstruction kernels introduced in FIG. 2 to processor 130 in support of deconvolution 430. This deconvolution can be the same function as the deconvolution that yielded image 435 with halo artifact 440 but applies the more suitable reconstruction kernel 210. The resultant image 470 thus better represents the light from fixture 410 as a point source 475.

While the subject matter has been described in connection with specific embodiments, other embodiments are also envisioned. Other variations will be evident to those of skill in the art. For example, though only one processor 130 is shown, the term "processor" should be read to include one or more integrated circuits capable of independently or collectively performing the various functions ascribed herein to processor 130. The same holds for memory 133. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An imaging device to capture a spatial-domain image of a scene, the imaging device comprising:
   memory to store multiple reconstruction kernels;
   a grating to produce an interference pattern from light from the scene;
   a photodetector array to sample the interference pattern to acquire frequency-domain image data; and
   a processor to select one of the reconstruction kernels responsive to the frequency-domain image data and construct the spatial-domain image of the scene from the frequency-domain image data and the selected one of the reconstruction kernels;
   wherein the processor samples different colors of the frequency-domain image data and selects the one of the reconstruction kernels responsive to intensities of the different colors.

2. The imaging device of claim 1, the multiple reconstruction kernels corresponding to spectra of different light sources.

3. The imaging device of claim 1, wherein the grating is a phase grating.

4. The imaging device of claim 1, the processor further to detect a point-source artifact in the frequency-domain image data and select the one of the reconstruction kernels responsive to the point-source artifact.

5. The imaging device of claim 4, the processor to identify color content of the point-source artifact and select the one of the reconstruction kernels responsive to the color content.

6. The imaging device of claim 5, wherein identifying the color content of the point-source artifact comprises independently sampling different colors of the point-source artifact and comparing intensities of the different colors.

7. The imaging device of claim 4, wherein the processor, to detect the point-source artifact, identifies a suprathreshold scene object.

8. A method of imaging a scene, the method comprising:
storing multiple reconstruction kernels;
passing light from the scene through a diffraction grating to produce an interference pattern;
sampling the interference pattern;
locating a point-source artifact of the sampled interference pattern;
identifying color content of the point-source artifact;
selecting one of the multiple reconstruction kernels responsive to the color content of the point-source artifact; and
constructing an image of the scene from the interference pattern and the selected one of the multiple reconstruction kernels;
wherein identifying the color content of the sampled interference pattern comprises independently sampling different colors of the point-source artifact and comparing intensities of the different colors.

9. The method of claim 8, the reconstruction kernel corresponding to a spectrum of a light source.

10. The method of claim 8, the reconstruction kernel corresponding to color temperatures of different light sources.

11. The method of claim 8, further comprising calculating the reconstruction kernel using point-spread functions of the diffraction grating.

12. A method of imaging a scene, the method comprising:
storing multiple reconstruction kernels;
passing light from the scene through a diffraction grating to produce an interference pattern;
sampling the interference pattern;
locating a center of a suprathreshold point-source artifact of the sampled interference pattern;
identifying color content of the suprathreshold point-source artifact;
selecting one of the multiple reconstruction kernels responsive to the color content of the suprathreshold point-source artifact; and
constructing an image of the scene from the interference pattern and the selected one of the multiple reconstruction kernels.

* * * * *